United States Patent
Boul et al.

(10) Patent No.: US 10,889,746 B2
(45) Date of Patent: Jan. 12, 2021

(54) SYNTHETIC HECTORITE IN GLASS BEAD SUSPENSIONS

(71) Applicant: Halliburton Energy Services, Inc., Houston, TX (US)

(72) Inventors: Peter James Boul, Houston, TX (US); Gregory Robert Hundt, Spring, TX (US); Joseph Kleber Maxson, Porter, TX (US); Simone Elizabeth Ashley Lumsden, Pearland, TX (US); Darrell Chad Brenneis, Marlow, OK (US); Ronnie Glen Morgan, Waurika, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/775,597

(22) Filed: Jan. 29, 2020

(65) Prior Publication Data
US 2020/0165507 A1 May 28, 2020

Related U.S. Application Data

(62) Division of application No. 15/557,410, filed as application No. PCT/US2015/028041 on Apr. 28, 2015, now Pat. No. 10,590,327.

(51) Int. Cl.
| | | |
|---|---|---|
| *E21B 21/00* | (2006.01) | |
| *E21B 33/14* | (2006.01) | |
| *C09K 8/473* | (2006.01) | |
| *C04B 28/04* | (2006.01) | |
| *C04B 14/10* | (2006.01) | |
| *C04B 14/22* | (2006.01) | |

(Continued)

(52) U.S. Cl.
CPC .............. *C09K 8/473* (2013.01); *C04B 14/10* (2013.01); *C04B 14/22* (2013.01); *C04B 18/027* (2013.01); *C04B 28/04* (2013.01); *C04B 40/0039* (2013.01); *E21B 21/003* (2013.01); *E21B 33/14* (2013.01)

(58) Field of Classification Search
CPC ......... C09K 8/473; C04B 14/10; C04B 14/22; C04B 18/027; C04B 28/04; C04B 40/039; E21B 21/003; E21B 33/14
See application file for complete search history.

(56) References Cited

U.S. PATENT DOCUMENTS

| | | | |
|---|---|---|---|
| 3,197,317 A | 7/1965 | Patchen | |
| 5,547,027 A * | 8/1996 | Chan | C04B 41/4853 166/295 |

(Continued)

FOREIGN PATENT DOCUMENTS

WO 2015047268 4/2015

OTHER PUBLICATIONS

"Use of Gel-type Cement to Cement Casing" by J.T. Reynolds, dated Jan. 1, 1942.

(Continued)

*Primary Examiner* — Silvana C Runyan
(74) *Attorney, Agent, or Firm* — Thomas Rooney; C. Tumey Law Group PLLC

(57) ABSTRACT

Provided is a glass bead suspension. The glass bead suspension comprises water, a synthetic hectorite having an empirical formula of $Si_8Mg_{5.45}Li_{0.4}H_4O_{24}Na_{0.7}$, and glass beads.

20 Claims, 2 Drawing Sheets

(51) Int. Cl.
  *C04B 18/02*   (2006.01)
  *C04B 40/00*   (2006.01)

(56) References Cited

U.S. PATENT DOCUMENTS

| | | | |
|---|---|---|---|
| 5,989,336 A | 11/1999 | Carpenter et al. | |
| 6,258,859 B1* | 7/2001 | Dahayanake | C11D 1/83 516/77 |
| 6,601,647 B2 | 8/2003 | Brothers et al. | |
| 6,630,021 B2 | 10/2003 | Reddy et al. | |
| 6,644,405 B2 | 11/2003 | Vijn et al. | |
| 7,284,611 B2 | 10/2007 | Reddy et al. | |
| 7,528,096 B2 | 5/2009 | Brannon et al. | |
| 9,371,478 B2 | 1/2016 | Chatterji et al. | |
| 9,580,638 B2 | 2/2017 | Boul et al. | |
| 2003/0177955 A1 | 9/2003 | Vijn et al. | |
| 2005/0241538 A1 | 11/2005 | Vargo et al. | |
| 2005/0241545 A1 | 11/2005 | Vargo et al. | |
| 2006/0258543 A1 | 11/2006 | Saini | |
| 2010/0044043 A1* | 2/2010 | Roddy | C09K 8/473 166/294 |
| 2011/0114318 A1* | 5/2011 | Ezell | C09K 8/512 166/305.1 |
| 2012/0152539 A1* | 6/2012 | Karcher | C09K 8/473 166/293 |
| 2013/0261032 A1* | 10/2013 | Ladva | C09K 8/00 507/131 |
| 2016/0084037 A1 | 3/2016 | Brothers et al. | |
| 2016/0115366 A1 | 4/2016 | Maxson et al. | |
| 2016/0177166 A1* | 6/2016 | Reddy | C09K 8/44 166/292 |
| 2017/0130119 A1 | 5/2017 | Boul et al. | |

OTHER PUBLICATIONS

"Microstructure, Permeability and Rheology of Bentonite-Cement Slurries" by Plee et al., published in 1990.
"Probing the Morphology of Laponite Clay Colloids by Atomic Force Microscopy" by Balnois et al., dated May 20, 2003.
"Light Scattering Characterization of Laponite Sols" by Rosta et al., dated Dec. 9, 1988.
"Structure and Formation of a Gel of Colloidal Disks" by Thompson et al., dated Jun. 1992.
"Shake Gels Based on Laponite-PEO Mixtures: Effect of Polymer Molecular Weight" by Can et al., published in 2005.
"Micron-scale Origin of the shear-induced structure in Laponite-poly(ethylene oxide) dispersions" by Bruyn et al., dated Feb. 13, 2007.
"Unusual Thixotropic Properties of Aqueous Dispersions of Laponite RD" by Willenbacher, dated Apr. 17, 1996.
"Experimental studies of the two phase flow and monodispersed pickering emulsions stabilized by laponite RD in a microfluidic t-junction" master degree thesis by Humaira Idris, dated Jun. 2014.
ISRWO International Search Report and Written Opinion for PCT/US2015/028041 dated Jan. 25, 2016.
Dudley W. Thompson, et al, The Nature of Laponite and It's Aqueous Dispersions, School of Chemistry, University of Bristol, Bristol BS8 1TS, U.K., accepted Oct. 30, 1991.

* cited by examiner

SYNTHETIC HECTORITE IN GLASS BEAD SUSPENSIONS

BACKGROUND

Provided are compositions, methods, and systems relating to cementing operations and, in certain examples, to including synthetic hectorite in glass bead suspensions for use in cement compositions.

Cement compositions may be used in a variety of subterranean operations. For example, in subterranean well construction, a pipe string (e.g., casing, liners, expandable tubulars, etc.) may be run into a wellbore and cemented in place. The process of cementing the pipe string in place is commonly referred to as "primary cementing." In a typical primary cementing method, a cement composition may be pumped into an annulus between the walls of the wellbore and the exterior surface of the pipe string disposed therein. The cement composition may set in the annular space, thereby forming an annular sheath of hardened, substantially impermeable cement (i.e., a cement sheath) that may support and position the pipe string in the wellbore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like.

A broad variety of cement compositions have been used in subterranean cementing operations. In some instances, cement compositions comprising glass beads have been used. Glass beads may typically be characterized as generally comprising hollow, mostly spherical structures used as lightweight additives for cement compositions. When desired for use, glass beads may be used to reduce a cement composition weight while consequently increasing a composition's volume. Among other things, the glass beads should be suitable for use in wellbore applications, for example, in both onshore and offshore operations.

While glass bead additives have been developed heretofore, challenges exist with their successful use in applications where long term storage is desirable or for glass beads comprising a diverse size distribution. For example, in offshore applications, if no liquid additive of glass beads are available, the cement must be dry-blended with the glass beads onshore and then transferred to the offshore platform where the dry blend may be mixed with sea water and then pumped. Multiple dry cement blends may be required because each blend is typically formulated for a specific cementing depth because of differences in temperature, pore pressures, and formation fracture gradients through different geological zones. Thus, it is not uncommon for substantial quantities of individual dry cement blends to be discarded to make space for blends designed for the sequential and different sections of the well as they are being cemented. This operation may require multiple trips between the blending facility and the offshore platform and can be wasteful in terms of time and cost. Additionally, dry-blends of glass beads may not be physically stable when handled multiple times via pneumatic conveyance and can segregate based on density during transport and storage. As well as the fact that handling the dry-blends with glass beads multiple times may result in some level of damage to certain amount of the beads, thus reducing their effectiveness as a light weight additive.

However, even if using a liquid additive of glass beads, problems may still persist. For example, formulating a stable suspension of the glass beads for long-term storage may be difficult. This may be especially true for glass beads compositions comprising a diverse particle or multimodal particle size distribution. For these reasons, suspension agents may be used to suspend the beads; however, not all suspension agents are effective. For example, bentonite is not able to make a stable suspension using beads that are not uniform in size and specific gravity, as these formulations may comprise higher viscosities and may be unsuitable for suspension using aids with high viscosities and yield points.

BRIEF DESCRIPTION OF THE DRAWINGS

These drawings illustrate certain aspects of some of the embodiments of the present method, and should not be used to limit or define the method.

DESCRIPTION OF PREFERRED EMBODIMENTS

Figure 1:
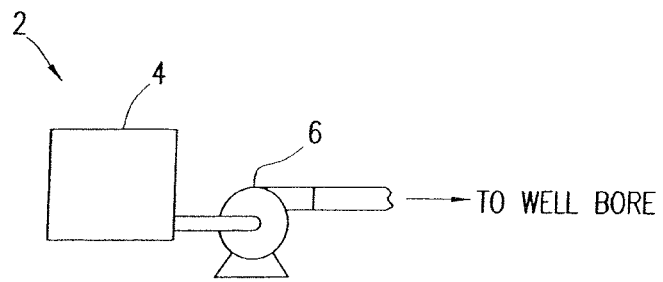
FIG. 1 illustrates a system for the preparation and delivery of a cement composition comprising a glass bead suspension to a wellbore.

Provided are compositions, methods, and systems relating to cementing operations and, in certain examples, to including synthetic hectorite in glass bead suspensions for use in cement compositions. Examples may comprise forming a glass bead suspension that comprises water, glass beads, and synthetic hectorite. The glass bead suspension may be used in cement operations. Examples may comprise adding the glass bead suspension to a cement composition and introducing the resultant composition into a subterranean formation.

Embodiments of the glass bead suspension may generally comprise water, synthetic hectorite, glass beads, and an optional pH buffer. Advantageously, the glass bead suspension may be highly resistant to separation so that they can be stored for an extended period of time. For example, the glass bead suspension may be stored for at least about 1 day, about 2 days, about 5 days, about 7 days, or longer. Advantageously, the glass bead suspension may suspend the glass beads in a stable solution without the glass beads floating out of solution over the storable period. Further advantageously, a variety of glass beads may be used including glass beads that comprise a multimodal particle size distribution and/or comprise varying specific gravities. While the glass bead suspension may be suitable for a number of cementing operations, they may be particularly suitable for use in offshore cementing applications as they may be added to a cement composition "on the fly," while on the offshore platform and thus may reduce the overall amount of onshore dry blending needed.

The water used in embodiments of the glass bead suspension may be from any source provided that it does not contain an excess of compounds that may undesirably affect other components in the glass bead suspension. The glass bead suspension may comprise fresh water. Salt water, including brines may interfere with other components of the glass bead suspension and reduce stability and/or storability of the glass bead suspension. Therefore, "water," when used to refer to the water required for the formulation of the glass bead suspension, refers to fresh water or other source of water that does not contain salt. However, "water," when used to refer to water added to a cement composition to form a cement composition, may be any such water, including saltwater, which would occur to one of ordinary skill in the art. The water may be present in an amount sufficient to form a suitable glass bead suspension. In certain examples, the water may be present in the glass bead suspension in an amount in the range of from about 35% to about 75% by weight of the glass bead suspension. One of ordinary skill in the art with the benefit of this disclosure will recognize the appropriate amount of water for a chosen application.

Embodiments of the glass bead suspension may comprise glass beads. In examples, the glass beads may be hollow. In some examples, the glass beads may be spherical. The glass beads may comprise any material suitable for making glass beads. Examples of materials may include borosilicate, ceramics, fly ash, cenospheres, and the like. Generally, the glass beads may have any particle size distribution as desired for a particular application. In certain examples, the glass beads may have a mean particle size in a range of from about 20 microns to about 100 microns. The mean particle size corresponds to d50 values as measured by particle size analyzers such as those manufactured by Malvern Instruments, Worcestershire, United Kingdom. The glass beads may have a multimodal particle size distribution. The glass beads may have varying specific gravities. An example of a suitable glass bead is available from POTTERS® Industries LLC, Valley Forge, Pa., as Q-CEL® Hollow Inorganic Microspheres. The glass beads may be used to reduce the weight of any cement composition to which the glass beads may be added. This may be of particular importance in applications in which reducing the density and/or increasing the volume of a cement composition is desired. The glass beads may be present in an amount sufficient to form a suitable glass bead suspension. In certain examples, glass beads may be present in the glass bead suspension in an amount of about 3% to about 80%, alternatively, from about 10% to about 50%, or alternatively, from about 20% to about 45% by weight of the suspension. In specific examples, the glass beads may be present in an amount ranging between any of and/or including any of about 3%, about 10%, about 20%, about 30%, about 40%, about 50%, about 60%, about 70%, or about 80% by weight of the glass bead suspension. One of ordinary skill in the art, with the benefit of this disclosure, should be able to select a type and concentration of glass bead for a glass bead suspension.

The glass bead suspensions may further comprise a synthetic hectorite. Among other reasons, a synthetic hectorite may be added to aid in stabilization of the glass beads in the glass bead suspension, such that, the glass bead suspension may be stored for an interval of time and the glass beads may remain suspended in solution. In examples, some synthetic hectorites are layered hydrous sodium lithium magnesium silicates, further; some may be modified with tetrasodiumpyrophosphate. An example of a commercially available synthetic hectorite is LAPONITE® synthetic layered silicate available from Southern Clay Products, Gonzales, Tex. Synthetic hectorite may be a platelet-like clay particle with an average thickness of about 1 nm to about 4 nm and a diameter of about 30 nm. The particle size of the synthetic hectorite once dispersed in water may be in a range of about 10 nm to about 50 nm; the average particle size of the synthetic hectorite when dispersed in water may be about 25 nm to about 30 nm. A specific example of a synthetic hectorite comprises the empirical formula $Si_8Mg_{5.45}Li_{0.4}H_4O_{24}N_{0.7}$. Without being limited by theory, synthetic hectorite particles may swell in water and may produce gels with water at concentrations greater than 0.5%. When water is added to a synthetic hectorite, it is believed that the synthetic hectorite platelets become ionized and the rising osmotic pressure in the interstitial fluid may be the cause of the particle swelling. When at equilibrium in water, the faces of a typical synthetic hectorite are negatively charged while the edges of the synthetic hectorite are positively charged. The polarity of the particles may be the cause of the rheological alterations in the glass bead suspension. The synthetic hectorite may be added to the other components in the glass bead suspension as a dry blend or as a synthetic hectorite slurry. In some examples, the synthetic hectorite may comprise a synthetic hectorite with a surface modification. For example, pyrophosphate may be used to bind the edges of the synthetic hectorite.

The synthetic hectorite may be included in the glass bead suspension, for example, to stabilize the glass beads in the glass bead suspension. The synthetic hectorite may be included in the glass bead suspension in an amount in the range of from about 0.01% to about 1.0% by weight of the glass bead suspension, for example. Alternatively, the synthetic hectorite may be included in the glass bead suspension in an amount in the range of from about 0.05% to about 0.5% by weight of the glass bead suspension. One of ordinary skill in the art, with the benefit of this disclosure, should be able to select a synthetic hectorite for a glass bead suspension formulation.

Examples of the glass bead suspension may optionally comprise a pH buffer. Any pH buffer may be used to maintain the pH of the glass bead suspension in a suitable range, for example, about 9 to about 10. Examples of pH buffers may include, but should not be limited to carbonates, bicarbonates, phosphates, hydroxides, and the like. The pH buffer may be present in the glass bead suspension in an amount in the range of from about 0.1% to about 5% by weight of the glass bead suspension. One of ordinary skill in the art, with the benefit of this disclosure, will recognize the appropriate amount of pH buffer to include for a chosen application.

Optional examples of the glass bead suspension may comprise a dispersant. Examples of suitable dispersants include, without limitation, sulfonated-formaldehyde-based dispersants (e.g., sulfonated acetone formaldehyde condensate), examples of which may include Daxad® 19 dispersant available from Geo Specialty Chemicals, Ambler, Pa. Other suitable dispersants may be polycarboxylated ether dispersants such as Liquiment® 5581F and Liquiment®514L dispersants available from BASF Corporation Houston, Tex.; or Ethacryl™ G dispersant available from Coatex, Genay, France. An additional example of a suitable commercially available dispersant is CFR™-3 dispersant, available from Halliburton Energy Services, Inc, Houston, Tex.

In some examples, the dispersant may be included in the glass bead suspension in an amount in the range of from about 0.01% to about 5% by weight of the glass bead suspension. In specific examples, the dispersant may be present in an amount ranging between any of and/or including any of about 0.01%, about 0.1%, about 0.5%, about 1%, about 2%, about 3%, about 4%, or about 5% by weight of the glass bead suspension. One of ordinary skill in the art, with the benefit of this disclosure, will recognize the appropriate amount of the dispersant to include for a chosen application.

Optionally, defoaming additives may be included in the glass bead suspension to, for example, reduce tendency for the glass bead suspension to foam during mixing and/or transferring of the glass bead suspension. Examples of suitable defoaming additives include, but are not limited to, polyol silicone compounds. Suitable defoaming additives are available from Halliburton Energy Services, Inc., under the product name D-AIR™ defoamers. In some examples, the defoamer may be present in the glass bead suspension in an amount in the range of from about 0.01% to about 5% by weight of the glass bead suspension. In specific examples, the defoamer may be present in an amount ranging between any of and/or including any of about 0.01%, about 0.1%, about 1%, about 2%, about 4%, or about 5%, by weight of the glass bead suspension. One of ordinary skill in the art, with the benefit of this disclosure, will recognize the appropriate amount of defoamer to include for a chosen application.

Those of ordinary skill in the art will appreciate that embodiments of the glass bead suspension generally should have a density suitable for a particular application. By way of example, the glass bead suspension may have a density in the range of from about 4 pounds per gallon ("ppg") to about 8 ppg. Those of ordinary skill in the art, with the benefit of this disclosure, will recognize the appropriate density for a particular application.

As previously mentioned, the glass bead suspension may be storable in a static state with the glass beads suspended over an interval of time without undesired separation or undesirable thickening. By way of example, the glass bead suspension may remain static with the glass bead suspended over a period of about one day or longer (e.g., at least about 1 day, about 2 days, about 7 days or more). Undesirable separation (e.g., the glass beads float to the top) occurs when the gel strength of the glass bead suspension is below 0.1 lbf/100 ft$^2$. Undesirable thickening (e.g., the glass bead suspension is not able to be remixed) occurs when the gel strength of the glass bead suspension is above 10 lbf/100 ft$^2$. Thus, a storable glass bead suspension is defined herein as a glass bead suspension that is capable of being stored in a static state with the glass beads suspended for at least about 1 day, about 2 days, about 7 days or more while maintaining a gel strength between 0.1 lbf/100 ft$^2$ and 10 lbf/100 ft$^2$. Optionally, after a desired storage period, the glass bead suspensions may be remixed as desired. Alternatively, the glass bead suspensions may not be remixed if desired. By way of example, an example glass bead suspension that is storable as described herein comprises a synthetic hectorite and the Q-CEL® Hollow Inorganic Microspheres described above and maintains a gel strength of 6 lbf/100 ft$^2$ over a period of at least about 3 days while in a static state and may be remixed when ready for use. Alternatively an example glass bead suspension comprising a bentonite and the Q-CEL® Hollow Inorganic Microspheres described above maintains a gel strength greater than 10 lbf/100 ft$^2$ over a period of at least about 3 days while in a static state and as such cannot be remixed when desired for use and is thus not suitable for the compositions, methods, and systems described herein.

As a non-limiting example, a glass bead suspension may be prepared by adding a synthetic hectorite to a mixture of a pH buffer and water. After mixing of the synthetic hectorite with this mixture, the glass beads may then be added. This mixture may then be agitated to suspend the glass beads in the mixture of the water, synthetic hectorite, and pH buffer. It should be understood that other suitable techniques may be used or preparation of a suitable glass bead suspension. For example, the components of the suspended may be combined in any suitable order to form the glass bead suspension.

When desired for use, the glass bead suspension may be added to a cement composition. Any cement compatible with the glass beads used in the glass bead suspension may be used. Examples of cements may include, but should not be limited to hydraulic cements that comprise calcium, aluminum, silicon, oxygen and/or sulfur, which set and harden by reaction with water. Suitable hydraulic cements may include, but are not limited to, Portland cements, pozzolana cements, gypsum cements, high alumina content cements, slag cements, silica cements, and combinations thereof. In certain examples, the hydraulic cement may comprise a Portland cement, including Portland cements classified as Classes A, C, G and H cements according to American Petroleum Institute, *API Specification for Materials and Testing for Well Cements*, API Specification 10, Fifth Edition, Jul. 1, 1990. In addition, Portland cements suitable for use may also include those classified as ASTM Type I, II, III, IV, or V.

The cement compositions may further comprise water, which may be freshwater, saltwater (e.g., water containing one or more salts dissolved therein), brine (e.g., saturated saltwater produced from subterranean formations), seawater, or combinations thereof. Generally, the water may be from any source, provided that it does not contain an excess of compounds that may undesirably affect other components in the cement composition. The water may be present in an amount sufficient to form a pumpable slurry. More particularly, the water may be present in an amount in the range of about 33% and about 200% by weight of the cement ("bwoc"). In some exemplary embodiments, the water may be present in an amount in the range of about 35% and about 70% bwoc.

The cement composition may optionally comprise any cement additives as would occur to one of ordinary skill in the art provided such additives do not interfere with other components of the cement composition, for example, the glass bead suspension. Examples of optional additives which may be added to the glass bead suspension as discussed above, for example, dispersants, defoamers, cement set retarders, fluid loss control agents, and the like, may also be added directly to the cement composition as an alternative to adding said additives to the glass bead suspension prior to mixing the glass bead suspension with the cement composition. With the benefit of this disclosure, one of ordinary skill in the art will be able to select an additive or additives for use with the cement composition to produce a desired composition.

As will be appreciated by those of ordinary skill in the art, the glass bead suspension may be used with cement in a variety of cementing operations, including primary and remedial cementing. In some examples, a cement composition may be provided that comprises water, cement, glass beads, a synthetic hectorite, and optionally a pH buffer. The cement composition comprising the glass bead suspension may be introduced into a subterranean formation and allowed to set therein. As used herein, introducing the cement composition into a subterranean formation includes introduction into any portion of the subterranean formation, including, without limitation, into a wellbore drilled into the subterranean formation, into a near wellbore region surrounding the wellbore, or into both.

In some examples, a glass bead suspension may be provided that comprises water, glass beads, a synthetic hectorite, and optionally a pH buffer. The glass bead suspension may be stored, for example, in a vessel or other suitable container. The glass bead suspension may be permitted to remain in storage for a desired time period. For example, the glass bead suspension may remain in storage for a time period of about 1 day or longer. For example, the glass bead suspension may remain in storage for a time period of about 1 day, about 2 days, about 5 days, about 7 days, or longer. In some examples, the glass bead suspension may remain in storage for a time period in a range of from about 1 day to about 7 days or longer. Thereafter, the glass bead suspension may be added to a cement composition, introduced into a subterranean formation, and allowed to set therein.

In primary cementing examples, the glass bead suspension may be added to a cement composition and introduced into an annular space between a conduit located in a wellbore and the walls of a wellbore (and/or a larger conduit in the wellbore), wherein the wellbore penetrates the subterranean formation. The cement composition comprising the glass bead suspension may be allowed to set in the annular space to form an annular sheath of hardened cement. The annular sheath of hardened cement may form a barrier that prevents the migration of fluids in the wellbore. The annular sheath of hardened cement may also, for example, support the conduit in the wellbore.

In remedial cementing examples, a glass bead suspension may be added to a cement composition. The cement composition may then be used, for example, in squeeze-cementing operations or in the placement of cement plugs. By way of example, the cement composition comprising the glass bead suspension may be placed in a wellbore to plug an opening (e.g., a void or crack) in the formation, in a gravel pack, in the conduit, in the cement sheath, and/or between the cement sheath and the conduit (e.g., a microannulus).

A method for cementing is disclosed. The method may be used in conjunction with any of the figures disclosed herein. The method comprises providing a glass bead suspension comprising water, a synthetic hectorite, and glass beads; mixing the glass bead suspension with components comprising cement and additional water to form a cement composition; and allowing the cement composition to set. The glass beads may have a multimodal particle size distribution in a range of from about 20 microns to about 100 microns. The glass beads may have at least two different specific gravities. The glass bead suspension may have a pH of about 9 to about 10. The glass bead suspension may comprise a pH buffer. The synthetic hectorite may have the empirical formula $Si_8Mg_{5.45}Li_{0.4}H_4O_{24}Na_{0.7}$. The method may further comprise storing the glass bead suspension for at least one day prior to the step of mixing the glass bead suspension with the components. The cement composition may further comprise an additive selected from the group consisting of a cement set retarder, a dispersant, a defoamer, a fluid loss control agent, and any combination thereof. The method may further comprise introducing the cement composition into a subterranean formation by way of a wellbore. The subterranean formation may be disposed underneath the ocean floor.

A glass bead suspension is disclosed. The glass bead suspension may be used in conjunction with any of the figures disclosed herein. The glass bead suspension comprises water, a synthetic hectorite, and glass beads. The glass beads may have a multimodal particle size distribution in a range of from about 20 microns to about 100 microns. The glass beads may have at least two different specific gravities. The glass bead suspension may have a pH of about 9 to about 10. The glass bead suspension may comprise a pH buffer. The synthetic hectorite may have the empirical formula $Si_8Mg_{5.45}Li_{0.4}H_4O_{24}Na_{0.7}$. The glass bead suspension may further comprise an additive selected from the group consisting of a dispersant, a defoamer, and any combination thereof.

A cementing system is disclosed. The system may be used in conjunction with any of the figures disclosed herein. The system comprises a glass bead suspension comprising water, a synthetic hectorite, and glass beads; a cement; and additional water; a mixing vessel capable of mixing the glass bead suspension, cement, and additional water to form a cement composition; and pumping equipment capable of pumping the cement composition. The glass beads may have a multimodal particle size distribution in a range of from about 20 microns to about 100 microns. The glass beads may have at least two different specific gravities. The glass bead suspension may have a pH of about 9 to about 10. The glass bead suspension may comprise a pH buffer. The synthetic hectorite may have the empirical formula $Si_8Mg_{5.45}Li_{0.4}H_4O_{24}Na_{0.7}$. The cement composition may further comprise an additive selected from the group consisting of a cement set retarder, a dispersant, a defoamer, a fluid loss control agent, and any combination thereof.

Referring now to FIG. 1, the preparation of a cement composition comprising a glass bead suspension will now be described. FIG. 1 illustrates a system 2 for the preparation of a cement composition comprising a glass bead suspension and subsequent delivery of the cement composition to a wellbore in accordance with certain embodiments. As shown, a glass bead suspension may be added to and mixed with a cement composition in a mixing vessel 4, such as a jet mixer, re-circulating mixer, or a batch mixer, for example, and then pumped via pumping equipment 6 to the wellbore. In some examples, the mixing vessel 4 and the pumping equipment 6 may be disposed on one or more cement trucks as will be apparent to those of ordinary skill in the art. In some examples, a jet mixer may be used, for example, to continuously mix the glass bead suspension with the cement composition as the cement composition is being pumped to the wellbore. In some examples, the glass bead suspension may be stored in a storage vessel prior to mixing with the cement composition. The glass bead suspension may be stored as needed until use with a cement composition is desired.

Figure 2A:
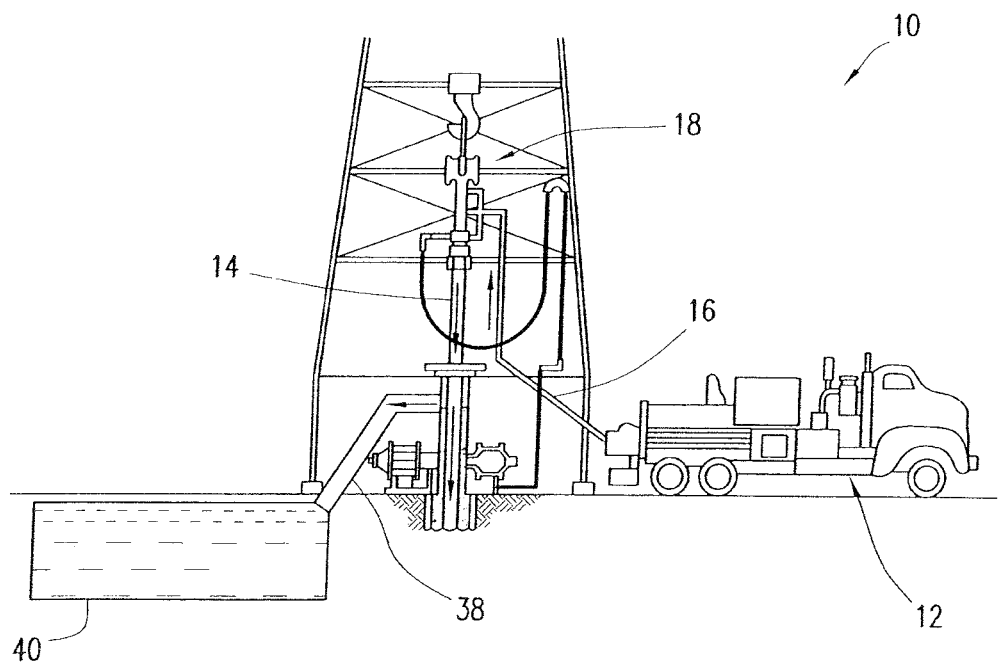
FIG. 2A illustrates surface equipment that may be used in the placement of a cement composition comprising a glass bead suspension in a wellbore.

An example technique for placing a cement composition comprising a glass bead suspension into a subterranean formation will now be described with reference to FIGS. 2A and 2B. FIG. 2A illustrates surface equipment 10 that may be used in the placement of a cement composition. It should be noted that while FIG. 2A generally depicts a land-based operation, those skilled in the art will readily recognize that the principles described herein are equally applicable to subsea operations that employ floating or sea-based platforms and rigs, without departing from the scope of the disclosure. As illustrated by FIG. 2A, the surface equipment 10 may include a cementing unit 12, which may include one or more cement trucks. The cementing unit 12 may include mixing vessel 4 and pumping equipment 6 (e.g., FIG. 1) as will be apparent to those of ordinary skill in the art. The cementing unit 12 may pump a cement composition 14 through a feed pipe 16 and to a cementing head 18 which conveys the cement composition 14 downhole.

Figure 2B:
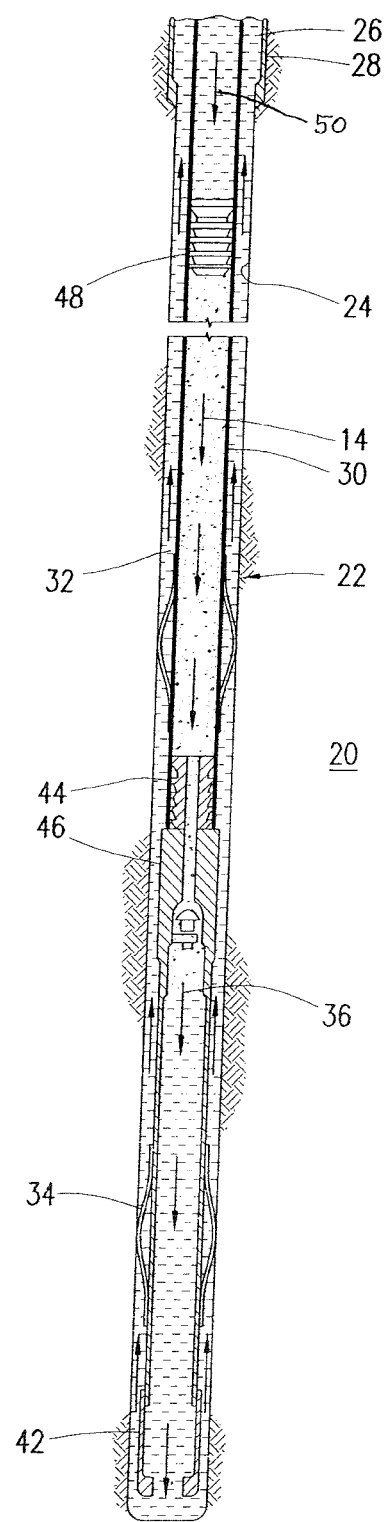
FIG. 2B illustrates the placement of a cement composition comprising a glass bead suspension into a wellbore annulus in accordance.

Turning now to FIG. 2B, the cement composition 14 may be placed into a subterranean formation 20. As illustrated, a wellbore 22 may be drilled into the subterranean formation 20. While wellbore 22 is shown extending generally vertically into the subterranean formation 20, the principles described herein are also applicable to wellbores that extend at an angle through the subterranean formation 20, such as horizontal and slanted wellbores. As illustrated, the wellbore 22 comprises walls 24. In the illustrated example, a surface casing 26 has been inserted into the wellbore 22. The surface casing 26 may be cemented to the walls 24 of the wellbore 22 by cement sheath 28. In the illustrated example, one or more additional conduits (e.g., intermediate casing, production casing, liners, etc.), shown here as casing 30 may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. At least a portion of the displaced fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the fluids 36 that may be inside the casing 30 prior to cementing. After the bottom plug 44 reaches the landing collar 46, a diaphragm or other suitable device should rupture to allow the cement composition 14 through the bottom plug 44. In FIG. 2B, the bottom plug 44 is shown on the landing collar 46. In the illustrated embodiment, a top plug 48 may be introduced into the wellbore 22 behind the cement composition 14. The top plug 48 may separate the cement composition 14 from a displacement fluid 50 and also push the cement composition 14 through the bottom plug 44.

The exemplary glass bead suspensions disclosed herein may directly or indirectly affect one or more components or pieces of equipment associated with the preparation, delivery, recapture, recycling, reuse, and/or disposal of the disclosed glass bead suspensions. For example, the disclosed glass bead suspensions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary glass bead suspensions. The disclosed glass bead suspensions may also directly or indirectly affect any transport or delivery equipment used to convey the glass bead suspensions to a well site or downhole such as, for example, any transport vessels, conduits, pipelines, trucks, tubulars, and/or pipes used to compositionally move the glass bead suspensions from one location to another, any pumps, compressors, or motors (e.g., topside or downhole) used to drive the glass bead suspensions into motion, any valves or related joints used to regulate the pressure or flow rate of the set-delayed cement compositions, and any sensors (i.e., pressure and temperature), gauges, and/or combinations thereof, and the like. The disclosed glass bead suspensions may also directly or indirectly affect the various downhole equipment and tools that may come into contact with the glass bead suspensions such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present disclosure, the following examples are given. In no way should the following examples be read to limit, or define, the entire scope of the disclosure.

EXAMPLES

Example 1

The following example describes a glass bead suspension comprising the following components:

TABLE 1

| Glass bead suspension Compositional Makeup | | | |
|---|---|---|---|
| Component | Mass (g) | Specific Gravity | Volume (cc) |
| Water | 390 | 0.998 | 390.78 |
| Glass Beads | 199.99 | 0.529 | 378.07 |
| Synthetic Hectorite | 1.55 | 2.65 | 0.58 |
| pH Buffer | 0.5 | 2.65 | 1.43 |
| Total | 592.05 | | 770.87 |

The glass beads were Q-CEL® Hollow Inorganic Microspheres available from POTTERS® Industries LLC, Valley Forge, Pa. The synthetic hectorite was LAPONITE® RD synthetic layered silicate available from Southern Clay Products, Inc., Gonzales, Tex. The pH buffer was sodium carbonate. The density of the glass bead suspension was 6.4 ppg.

After preparation, the volume average viscosity (VAV) of the sample was measured at 25 $sec^{-1}$ ranges over 7 days using a using a Model 35A FANN® Viscometer and a No. 2 spring, in accordance with the procedure set forth in API RP Practice 10B-2, *Recommended Practice for Testing Well Cements*. The results are presented in Table 2 below.

TABLE 2

Rheological Profile

| Time (Hrs.) | VAV at 25 rps (cP) | Yield Point (Pa) |
|---|---|---|
| 0 | 42 | 0.5 |
| 24 | 50 | 0.5 |
| 96 | 60 | 1.0 |

Example 2

The following example describes a cement composition comprising the glass bead suspension of Example 1:

TABLE 3

Cement Composition Compositional Makeup

| Component | Mass (g) | Specific Gravity |
|---|---|---|
| Cement | 208.96 | 3.17 |
| Water | 107.90 | 0.998 |
| Glass bead suspension | 321.62 | 0.767 |
| Fluid Loss Control Agent | 4.18 | 1.46 |
| Defoamer | 0.32 | 0.93 |
| VAV at 25 rps (cP) | | 664 |
| Yield Point (Pa) | | 0.53 |

The cement was Dyckerhoff class G Portland cement available from Dyckerhoff GmbH of Weisbaden, Germany. The fluid loss control agent was Halad®-567 Fluid Loss Additive available from Halliburton Energy Services, Inc., Houston, Tex. The defoamer was D-Air 3000L™ defoamer available from Halliburton Energy Services, Inc., Houston, Tex. The water was in addition to the water already present in the glass bead suspension. The density of the cement composition was 9 ppg.

After preparation, the volume average viscosity (VAV) of the sample was measured at 25 $\sec^{-1}$ using a using a Model 35A FANN® Viscometer and a No. 2 spring, in accordance with the procedure set forth in API RP Practice 10B-2, *Recommended Practice for Testing Well Cements*. The results are presented in Table 3 above.

Example 3

The following example describes a cement composition comprising the glass bead suspension of Example 1:

TABLE 4

Cement Composition Compositional Makeup

| Component | Mass (g) | Specific Gravity |
|---|---|---|
| Cement | 329.47 | 3.17 |
| Water | 170.62 | 0.998 |
| Glass bead suspension | 241.29 | 0.767 |
| Fluid Loss Control Agent | 6.59 | 1.46 |
| Defoamer | 0.51 | 0.93 |
| VAV at 25 rps (cP) | | 717 |
| Yield Point (Pa) | | 1.0 |

The cement was Dyckerhoff class G Portland cement available from Dyckerhoff GmbH of Weisbaden, Germany. The fluid loss control agent was Halad®-567 Fluid Loss Additive available from Halliburton Energy Services, Inc., Houston, Tex. The defoamer was D-Air 3000L™ defoamer available from Halliburton Energy Services, Inc., Houston, Tex. The water was in addition to the water already present in the glass bead suspension. The density of the cement composition was 10.5 ppg.

After preparation, the volume average viscosity (VAV) of the sample was measured at 25 $\sec^{-1}$ using a using a Model 35A FANN® Viscometer and a No. 2 spring, in accordance with the procedure set forth in API RP Practice 10B-2, *Recommended Practice for Testing Well Cements*. The results are presented in Table 4 above.

Example 4

The following example describes a cement composition comprising the glass bead suspension of Example 1:

TABLE 5

Cement Composition Compositional Makeup

| Component | Mass (g) | Specific Gravity |
|---|---|---|
| Cement | 449.91 | 3.17 |
| Water | 233.55 | 0.998 |
| Glass bead suspension | 160.81 | 0.767 |
| Fluid Loss Control Agent | 9.00 | 1.46 |
| Defoamer | 0.7 | 0.93 |
| VAV at 25 rps (cP) | | 771 |
| Yield Point (Pa) | | 0.012 |

The cement was Dyckerhoff class G Portland cement available from Dyckerhoff GmbH of Weisbaden, Germany. The fluid loss control agent was Halad®-567 Fluid Loss Additive available from Halliburton Energy Services, Inc., Houston, Tex. The defoamer was D-Air 3000L™ defoamer available from Halliburton Energy Services, Inc., Houston, Tex. The water was in addition to the water already present in the glass bead suspension. The density of the cement composition was 12 ppg.

After preparation, the volume average viscosity (VAV) of the sample was measured at 25 $\sec^{-1}$ using a using a Model 35A FANN® Viscometer and a No. 2 spring, in accordance with the procedure set forth in API RP Practice 10B-2, *Recommended Practice for Testing Well Cements*. The results are presented in Table 5 above.

The results of Examples 2-4 illustrate that the glass bead suspension is stable and that the viscosities at 25 $\sec^{-1}$ remain below 800 cP. 800 cP is generally viewed as the limit for pumpability of a liquid additive into a cement.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present embodiments are well adapted to attain the ends and advantages mentioned as well as those that are inherent therein. The particular embodiments disclosed above are illustrative only, as the present embodiments may be modified and practiced in different but equivalent manners apparent to those skilled in the art having the benefit of the teachings herein. Although individual embodiments are discussed, all combinations of each embodiment are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present disclosure. If there is any conflict in the usages of a word or term in this specification and one or more patent(s) or other documents that may be incorporated herein by reference, the definitions that are consistent with this specification should be adopted.

What is claimed is:

1. A glass bead suspension comprising:
    water;
    a synthetic hectorite, wherein the synthetic hectorite has an empirical formula of $Si_8Mg_{5.45}Li_{0.4}H_4O_{24}Na_{0.7}$;
    hollow glass beads;
    a fluid loss control agent; and
    a defoamer, wherein the defoamer is present in an amount of about 0.01% to about 5% by weight of the glass bead suspension,
    wherein the hollow glass beads have a specific gravity of less than 0.5, and wherein the glass bead suspension has a specific gravity of less than or equal to 0.8.

2. The glass bead suspension of claim 1, wherein the hollow glass beads have a multimodal particle size distribution in a range of from about 20 microns to about 100 microns.

3. The glass bead suspension of claim 1, wherein the hollow glass beads have at least two different specific gravities.

4. The glass bead suspension of claim 1, wherein the glass bead suspension has a pH of about 9 to about 10.

5. The glass bead suspension of claim 1, further comprising an additive selected from the group consisting of a dispersant, a defoamer, and any combination thereof.

6. The glass bead suspension of claim 1, wherein the hollow glass beads are present in an amount of about 3% to about 80% by weight of the suspension.

7. The glass bead suspension of claim 1, wherein the hollow glass beads are present in an amount of about 20% to about 40% by weight of the suspension.

8. The glass bead suspension of claim 1, wherein the water is present in amount of about 35% to about 75% by weight of the suspension.

9. The glass bead suspension of claim 1, wherein the synthetic hectorite has an average thickness of about 1 nm to about 4 nm.

10. The glass bead suspension of claim 1, wherein the synthetic hectorite has an average particle size of about 10 nm to about 50 nm.

11. The glass bead suspension of claim 1, wherein the synthetic hectorite has an average particle size of about 25 nm to about 30 nm.

12. The suspension of claim 1, wherein the synthetic hectorite is present in an amount of about 0.1% to about 1.0% by weight of the suspension.

13. The glass bead suspension of claim 1, further comprising cement, a fluid loss control agent, and about 0.01% to about 5% defoamer by weight of the glass bead suspension.

14. A glass bead suspension comprising:
    water, wherein the water is present in an amount of about 35% to about 75% by weight of the suspension;
    a synthetic hectorite, wherein the synthetic hectorite has an empirical formula of $Si_8Mg_{5.45}Li_{0.4}H_4O_{24}Na_{0.7}$, wherein the synthetic hectorite is present in an amount of about 0.01% to about 1.0% by weight of the suspension;
    hollow glass beads, wherein the hollow glass beads are present in an amount of about 3% to about 80% by weight of the suspension;
    a fluid loss control agent;
    a defoamer, wherein the defoamer is present in an amount of about 0.01% to about 5% by weight of the glass bead suspension; and
    a pH buffer to maintain a pH of the suspension of about 9 to about 10, wherein the pH buffer is sodium carbonate, present in an amount of about 0.1% to about 5% by weight of the glass bead suspension,
    wherein the hollow glass beads have a specific gravity of less than 0.5, and wherein the glass bead suspension has a specific gravity of less than or equal to 0.8.

15. The glass bead suspension of claim 14, wherein the synthetic hectorite has an average thickness of about 1 nm to about 4 nm.

16. The glass bead suspension of claim 14, wherein the synthetic hectorite has an average particle size of about 10 nm to about 50 nm.

17. The glass bead suspension of claim 14, wherein the synthetic hectorite has an average particle size of about 25 nm to about 30 nm.

18. The glass bead suspension of claim 15, wherein the hollow glass beads are present in an amount of about 20% to about 40% by weight of the suspension.

19. The glass bead suspension of claim 15, wherein the hollow glass beads have a multimodal particle size distribution in a range of from about 20 microns to about 100 microns.

20. The glass bead suspension of claim 14, further comprising a dispersant present in an amount of about 0.01% to about 5% by weight of the glass bead suspension.

* * * * *